United States Patent
Altius

(10) Patent No.: US 9,613,378 B2
(45) Date of Patent: Apr. 4, 2017

(54) DISTRIBUTED RANKING AND MATCHING OF MESSAGES

(71) Applicant: Nasdaq Technology AB, Stockholm (SE)

(72) Inventor: Göran Altius, Vallentuna (SE)

(73) Assignee: Nasdaq Technology AB, Stockholm (SE)

( * ) Notice: Subject to any disclaimer, the term of this patent is extended or adjusted under 35 U.S.C. 154(b) by 0 days.

(21) Appl. No.: 13/918,189

(22) Filed: Jun. 14, 2013

(65) Prior Publication Data

US 2014/0040095 A1    Feb. 6, 2014

Related U.S. Application Data

(63) Continuation of application No. 12/007,805, filed on Jan. 15, 2008, now abandoned.

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC ............... G06Q 40/04; G06Q 30/0275; G06Q 30/0208; G06Q 40/06; G06Q 40/00
See application file for complete search history.

(56) References Cited

U.S. PATENT DOCUMENTS

| | | | |
|---|---|---|---|
| 5,924,082 A * | 7/1999 | Silverman et al. | 705/37 |
| 7,251,630 B1 * | 7/2007 | Gupta et al. | 705/37 |
| 8,533,104 B2 * | 9/2013 | Cheng et al. | 705/37 |
| 2003/0158806 A1 | 8/2003 | Hanley et al. | |
| 2005/0283422 A1 | 12/2005 | Myr | |
| 2006/0026407 A1 | 2/2006 | Chauvel | |
| 2006/0090161 A1 | 4/2006 | Bodas et al. | |
| 2006/0106712 A1 | 5/2006 | Guo et al. | |
| 2007/0033425 A1 | 2/2007 | Clark | |
| 2007/0047843 A1 | 3/2007 | Kazama | |
| 2007/0118457 A1 | 5/2007 | Peterffy et al. | |

(Continued)

FOREIGN PATENT DOCUMENTS

| | | | | |
|---|---|---|---|---|
| GB | WO 9605563 A1 * | 2/1996 | | G06F 17/60 |
| JP | 58-106637 | 6/1983 | | |

(Continued)

OTHER PUBLICATIONS

"What is a Network Switch vs. a Router?" http://www.Cisco.com. Dec. 18, 2011. <http://web.archive.org/web/20111218150533/http://www.cisco.com/cisco/web/solutions/small_business/resource_center/articles/connect_employees_and_offices/what_is_a_network_switch/index.html> (2 pages).*

(Continued)

*Primary Examiner* — Elda Milef
(74) *Attorney, Agent, or Firm* — Nixon & Vanderhye P.C.

(57) ABSTRACT

Apparatus and methods for managing messages in a computer system are described. A plurality of order/quote messages is received via an input mechanism, and the order/quote messages are ranked based on the at least one ranking value parameter at a first ranking unit. At least one top ranked order/quote message is sent from the first ranking unit to a matching unit, and the top ranked order/quote messages are matched at the matching unit.

14 Claims, 6 Drawing Sheets

(56) References Cited

U.S. PATENT DOCUMENTS

| | | |
|---|---|---|
| 2008/0010183 A1 | 1/2008 | Holmes et al. |
| 2008/0243675 A1 | 10/2008 | Parsons et al. |
| 2009/0076946 A1 | 3/2009 | Kelly et al. |

FOREIGN PATENT DOCUMENTS

| | | |
|---|---|---|
| JP | 2005-018381 | 1/2005 |
| JP | 2007-060392 | 3/2007 |
| JP | 2007-280394 | 10/2007 |
| JP | 2010-530591 | 9/2010 |
| WO | WO 00/63814 | 10/2000 |
| WO | WO 2007/014892 A2 | 2/2007 |
| WO | WO 2007014892 A2 * | 2/2007 |
| WO | 2007/037006 | 4/2007 |
| WO | WO 2007/126838 | 11/2007 |

OTHER PUBLICATIONS

"Nonvolatile memory." Microsoft Computer Dictionary. 5th ed. 2002. p. 367. (3 pages).*
U.S. Appl. No. 12/007,805, filed Jan. 15, 2008; Inventor: Altius.
Office Action mailed Sep. 30, 2009 in U.S. Appl. No. 12/007,805.
Office Action mailed Mar. 31, 2010 in U.S. Appl. No. 12/007,805.
Domowitz: "The Mechanics of Automated Trade Execution Systems," Journal of Financial Intermediation 1, pp. 167-194 (1990).
Koch, "Discovering Multi-Core: Extending the Benefits of Moore's Law", Technology Intel Magazine, Jul. 2005, pp. 1-6.
Gepner, "Multi-Core Processors: New Way to Achieve High System Performance", International Symposium on Parallel Computing in Electrical Engineering, Sep. 2006, pp. 9-13.
International Search Report, Written Opinion for PCT/EP2009/050286 dated Apr. 24, 2009.
English Summary of Japanese Office Action mailed Aug. 2, 2013 in Japanese Application No. 2010-541801.

* cited by examiner

DISTRIBUTED RANKING AND MATCHING OF MESSAGES

PRIORITY APPLICATION

This application is a continuation application claiming priority from U.S. application Ser. No. 12/007,805, filed Jan. 15, 2008, the entire contents of which are hereby incorporated by reference.

TECHNICAL FIELD

The present invention relates to an electronic exchange system, in particular it relates to management of messages in an electronic exchange system.

BACKGROUND

The financial industry is one of the most important contributors for a society. For example the financial sector makes it possible for companies to obtain investment money, to secure themselves from different kinds of risk and so forth. A strong financial sector is essential for trade and industry and economical development. In the past ten to twenty years the financial technology has had a very rapid development due to the technological advances in computing technology, transaction technology and information technology. This rapid development has resulted in that more companies and people are connected to these systems. The increase of participants being connected to electronic exchange systems have increased the amount of data messages sent into the system. Furthermore the development of algorithmic trading have even further increased the amount of data messages being sent into the electronic exchange systems.

These electronic exchanges receive data messages from external devices used by traders that sends in orders and/or quotes to the exchange. The orders may relate to buying and/or selling of any type of financial instrument.

The term "financial instruments" is in the present application used in a broad sense and encompasses any tradable item i.e. securities, derivative or commodity, such as stocks, bonds, cash, swaps, futures, foreign exchange, options, gas electricity and so forth, or group of items that is traded through matching of counterparty orders (bid, offer). An order normally includes a price and a volume of the item(s) or combination of items. The price and the volume can be viewed as order prerequisites that have to be met in order for a match (deal) to take place.

Thus, the massive amount of data messages sent in to the exchanges has put a lot of pressure on the computer system that needs to handle all the messages. For example, the systems and software for the exchanges needs to maintain an orderbook wherein all orders/quotes are stored. Furthermore the system and software must maintain a BBO (Best Bid and Offer) which is calculated as the highest bid price, and the lowest offer price. The BBO is published to market participants, and the marketplace system uses the BBO to evaluate whether quotes and orders can be matched.

In the exchange systems known today the management of the orderbook and the BBO calculation is centralized. The marketplace system maintains bid quotes and bid orders in an orderbook sorted by their price in descending order. The best bid price is calculated from the price of the first entry in this orderbook. The system also maintains an orderbook of offer quotes and offer orders in an orderbook sorted by price in ascending order. The best offer price is calculated from the price of the first entry in this orderbook.

As mentioned before a problem with the known electronic exchange systems is that they have a hard time to keep up with the massive amount of messages and thus constitutes a bottleneck which puts a limitation on the performance of the system. Thus, a problem with prior art systems is that they have a low trough put. Another problem with the prior art systems is that they have high latency.

Hence there is a need of an improved electronic exchange system that allows higher through put of messages and lower latency.

SUMMARY

Thus it is an object to provide a solution for improving the performance of an electronic exchange system.

It is another object to increase through put in an electronic exchange system.

It is another object to lower the latency in an electronic exchange system.

It is another object to minimize the load on the matching unit in an electronic exchange system.

It is another object to achieve faster matching in an electronic exchange system.

According to a first aspect the above and other objects are fulfilled by providing a computer system for managing order/quote messages comprising at least one ranking value parameter, the order/quote messages being sent by participants over a network and is received by an input mechanism, the computer system comprising:
   at least a first ranking unit associated with the input mechanism, for ranking the order/quote messages based on the at least one ranking value parameter,
   a matching unit associated with the ranking unit, for matching the ranked order/quote messages,
   wherein the at least first ranking unit is separated from the matching unit so as to rank order/quote messages before they are sent to the matching unit.

The computer system has the advantage of improved performance since the matching unit that calculates the BBO and/or matches orders/quotes does not need to rank the order/quote messages. Thus configuration of the system affects the technical working of the system by causing faster processing of messages in the matching unit. The ranking is thus done before the messages reach the matching unit, thereby only the best ranked messages is handled by the matching unit. In a preferred embodiment the first ranking unit is located at a first core in a multi-core processor and the matching unit may be a second core in a multi-core processor. By having this configuration of the computer system, improved throughput and latency is achieved.

In another embodiment a first server may comprise the ranking unit and a second server may comprise the matching unit, the servers being connectable in a server system so as to first rank and then match the order/quote messages.

The messages, which comprises input data, are herein called order/quote messages and preferably further comprises at least a bid order or an ask order or both. The messages preferably comprise a data structure suitable for being readable by a computer system.

The ranking unit may be configured to rank a first bid order with a second bid order, and to deliver a top ranked bid order to the matching unit. By a top ranked bid order means that it is the best bid order of the first and second bid order. Thus, if an exchange ranks according to price/time priority it is the bid order that has the highest price that is the top ranked bid order. Thus, the ranking unit compares the first bid order and the second bid order, and based on which bid order that has the highest price, the ranking unit sends that bid order as the top ranked bid to the matching unit.

For clarity the definition of a bid is as follows: bid price is the highest price a buyer is prepared to pay at a particular time for a trading unit of a given financial instrument or security. The definition of an ask is as follows: ask price is the lowest price a seller is prepared to receive for a financial instrument or security which is offered for sale by a trader.

The ranking unit may also be configured to rank a first ask order with a second ask order, and to deliver a top ranked ask order to the matching unit. Top ranked ask order means that it is the best ask order. Thus, if an exchange ranks according to price/time it is the ask order that has the lowest price that is the top ranked ask order.

The computer system may further comprise a second level ranking unit associated with the at least first ranking unit and the matching unit, so as to rank a third incoming order/quote message with a top ranked order/quote message received from the at least first ranking unit before sending a second top ranked order/quote message to the matching unit. Thus, the system may comprise a hierarchy of ranking units wherein each ranking unit ranks two orders and sends the best ranked order to the next level ranking unit or to the matching unit depending on where in the hierarchy the ranking unit is located. This has the advantage that also the ranking is shared between different ranking units, which improve the performance of the exchange system since the first ranking unit will only rank the first and second order and the second level ranking unit will rank the best ranked order with the third order/quote message. Hence, it does not need to handle the order that was received at the first ranking unit and which was not top ranked.

The ranking units may further comprise a consolidator for consolidating top ranked order/quote messages so as to minimize overhead when sending the top ranked order/quote message to the matching unit. For example if two orders, both gets top ranking or if the exchange for some reason is configured to consolidate messages for some other reason, such as for saving bandwidth and so forth.

The computer system may further comprise a memory associated with the matching unit for storing top ranked order/quote messages. This memory is preferably a very fast memory such a RAM, DRAM or the alike.

Preferably the ranking in the computer system is based on at least one of the following parameters: price parameter, time parameter, volume parameter, participant type, client category, and yield.

Which ranking parameters that are used, differs between different exchanges and their configuration. Price and time ranking is very common In which order the parameters is used may be based on which is most important according to the specific exchange rules configuration. For example, the first ranking is done based on price, second ranking may be based on time. The probability that an order would need further ranking after price and time ranking has been performed is very rare. However if it is necessary a system could further rank on volume then on participant type, then on client category and then on yield if applicable.

Price ranking means the order having the best price is top ranked. Time ranking means that the first order is top ranked, i.e. earliest time stamp upon entry into the system. Ranking based on participant type means that the order is ranked based on if the owner of the order is a market maker or if the owner is a broker. For example a broker may go before a market maker. Ranking based on client category means that the order is ranked based on for example how professional a participant is, i.e. non-professional or professional. Usually non professional have better protection and thus obtains advantages to professional clients. Ranking base on yield is preferably only applicable when trading yield instruments.

The computer system may further comprise a ranking unit for ranking bid orders and a second ranking unit for ranking ask orders, both ranking units being associated with the matching unit. The advantages by such an arrangement is that the system can receive and process bid orders and ask order at different ranking units in parallel, which further improves the performance of the system.

In a second aspect the above and other objects are achieved by an electronic exchange comprising the computer system as described above.

The computer system may thus be an integrated module in an electronic exchange. It can also be a stand alone module that can be implemented or sold separately as a matching engine.

In a third aspect, the above and other objects are fulfilled by a method implemented on a computer system for managing order/quote messages comprising at least one ranking value parameter, the order/quote messages being sent by participants over a network, the method comprising:
  receiving a plurality of order/quote messages via an input mechanism,
  ranking the order/quote messages based on the at least one ranking value parameter at a first ranking unit,
  sending at least one top ranked order/quote message from the first ranking unit to a matching unit,
  matching the top ranked order/quote messages at the matching unit.

The method has the advantage of improving performance of a computer system since the ranking step is performed at a ranking unit before sending a top ranked order to the matching unit, as mentioned before, thereby improved performance is achieved.

As mentioned above order/quote messages may comprise bid orders, in this case the method may further comprise the steps of:
  ranking a first bid order with a second bid order at the ranking unit, so that at least one bid order is ranked as the top bid order based on the ranking value parameter.

In the case when the order/quote message comprises ask order the method may further comprise the steps of:
  ranking a first ask order with a second ask orders at the ranking unit, so that at least one ask order is ranked as the top ask order based on the ranking value parameter.

The method may also comprise the step of storing the order/quote messages not ranked in top position in a first memory allocation associated with the ranking unit. The first memory allocation may be a RAM, a cache memory or a buffer or the alike.

The method may also comprise the step of storing the top ranked order/quote messages, if not matched, in a second memory allocation associated with the matching unit. Thereby there will preferably always be top ranked order/quote messages present in the matching unit.

In the case that two compared order/quote messages are ranked equally in a first ranking attempt the method preferably comprises a second ranking step, ranking the order/quote messages based on a second ranking parameter, if the first ranking resulted in two or more top rankings among the order/quote messages. The method may also comprise a third ranking step, ranking the order/quote messages based on a third ranking parameter, if the second ranking also resulted in two or more top rankings among the order/quote messages.

The method may also comprise the step of consolidating the order/quote messages if the first ranking resulted in two or more top rankings and placing the top ranked orders in a consolidated order/quote message in a priority order based on the outcome from the second ranking, or even third ranking. Thereby the method saves overhead which improves the performance of the system.

In order to further improve the performance of the system the method may further comprise the steps of:
- upon match in the matching unit sending a deal message to the associated ranking units,
- upon reception of the deal message at the ranking unit, the ranking unit sends a new top ranked order/quote message to the matching unit so that a top ranked order/quote message is present any time in the matching unit.

Thereby unnecessary acknowledgement/negative acknowledgment messages are avoided and improved latency as well as throughput is achieved.

Preferably the deal message is only sent to the relevant ranking units. Thus the deal message is routed back via the ranking units all the way to the gateway. Since such a deal message only have to pass through the ranking units that it passed on the way to the matching unit, other ranking units not relevant for the deal message will not be interfered with. Thereby the trader that sent in the order will be informed about the deal.

In a fourth aspect, the above and other objects are fulfilled by a processor configured to rank and match orders received as input data, the processor comprising a first core dedicated to rank orders and a second core dedicated to match orders, the first core and second core is connectable so as to transfer input data there between.

Preferably the first core comprises a process for ranking orders and the second core comprises a process for matching orders. Thereby each core unit is configured on how to handle the input data that is received.

The processor may further comprise a third core configured to rank orders. For example the first core could be configured to rank bid orders and the third core could be configured to rank ask orders. Thus, in the case the processor comprises three core units the first core may be configured to rank bid orders, the third core may be configured to rank ask orders and the second core may be configured to match the ranked bid orders and the ranked ask orders sent from the first and third core over a bus to the second core. As mentioned earlier it is preferably the top ranked orders from each ranking core that is sent to the matching core.

The processor may comprise an odd or even number of cores, for example 2, 4, 8, 10, 16 cores or 18 to 50 cores or even more cores such as 100, 300, 500, 1000 core units. Usually these processors are called multi-core processors if the number of cores is less or equal to 8 and many core processors if there are more than 8 cores. Thus there may be a plurality of cores configured to rank bid orders received as input data, and a plurality of cores configured to rank ask orders received as input data.

In a fifth aspect, the above and other objects are fulfilled by a computer readable medium comprising computer-executable instructions for causing an electronic exchange to perform the method described above, or for causing a processor comprising multiple cores to perform the method described above.

In a further embodiment the BBO calculation or matching could be performed in different levels. Thus the marketplace may first be split into submarkets. The system then calculates a separate BBO for each submarket. This BBO is then used in the next level BBO calculation where each calculation includes a set of the separate BBOs from the previous level of submarkets. This aggregation continues until the BBO for the entire marketplace has been calculated.

These and other aspects will be apparent from and elucidated with reference to the example embodiments described hereinafter.

DESCRIPTION OF EXAMPLE EMBODIMENTS

Figure 1:
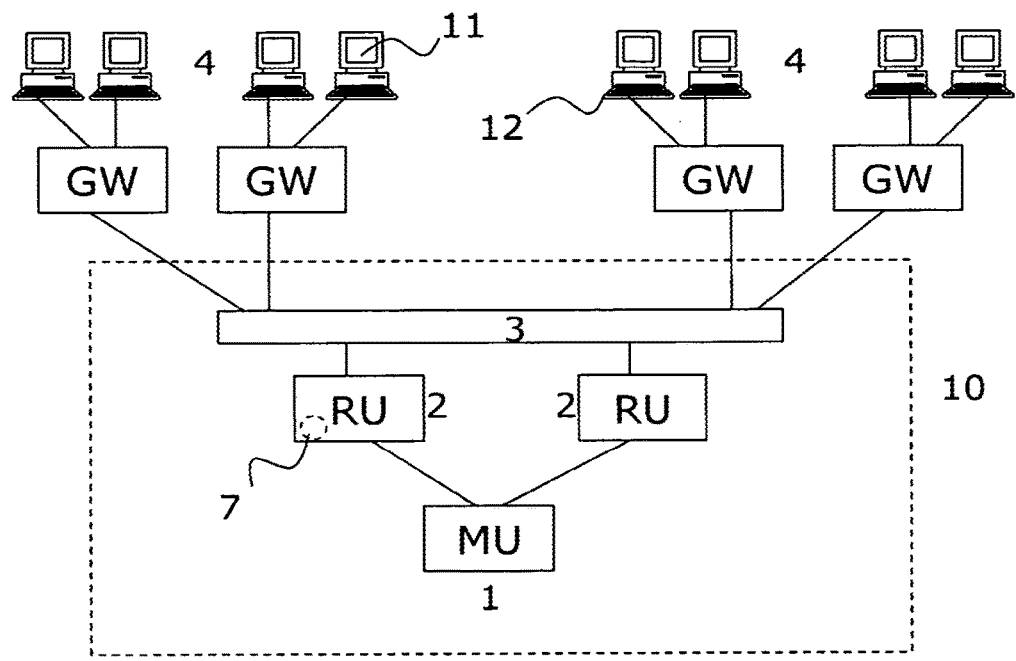
FIG. 1 is a schematic drawing of an operating environment.

FIG. 1 shows an embodiment of an electronic exchange. The electronic exchange is used for trading in financial instruments. The electronic exchange preferably comprises a matching unit 1 (MU), two ranking units 2 (RU) and an input mechanism 3. Furthermore the electronic exchange is connected to a number of external devices 4, terminals that are used by the users or traders connected to the electronic exchange via gateways (GW) so as to receive information about the market via a display 11 and to add information (mainly sending in orders) to the market via input means 12. Preferably the external computer devices comprise trading applications that are used by traders to send in orders to the electronic exchange. In one embodiment the ranking units 2 may comprise consolidators 7 for consolidating messages.

In the figure only gateways are mentioned, however other network devices suitable for the purpose of transaction of data over a network may also be used, for example, routers, bridges and so forth. The input mechanism 3 may preferably be a module of the central electronic exchange 10, that receives order/quote messages from the external devices 4 over the network. The input mechanism is preferably configured to route the order/quote messages to either a ranking unit for bid orders or to a ranking unit for ask orders depending on the content of the message, thus the input mechanism preferably comprises a selector that selects where a specific message should be sent depending on the content of the message. The input mechanism may further be configured to time stamp each order that is entered into the central electronic exchange 10. Of course the central electronic exchange also comprises an output mechanism for information dissemination to the external devices 4, however it is not in the figure for simplicity reasons. Time stamping of the orders entering the system may either be upon entry into the central exchange or preferably the order is time stamped by a ranking unit when it does not receive a top ranking. Thus the better price an order have the order will receive a time stamp by a more central ranking unit.

Since the ranking units usually are connected to the same clock the accuracy is very high.

The external devices 4 are usually located at the participant's location, and are usually desktop or laptop computers, however they may also be mobile devices such as hand held terminals i.e. mobile phones and so forth. Of course the network would have to have a connection point for mobile communication in that case. For simplicity this is not illustrated in the figure.

Naturally, display 11 should be regarded in broad sense as any means for presenting information, although preferably a mean for visual presenting the information, and the input board 12 should be regarded in broad sense as any means for inputting information, although preferably a means for physically pressing a key (keyboard, mouse, game controller for e.g. PS3 and so forth). The display and input board could also be formed as a common device, such as an interactive screen.

Figure 2:
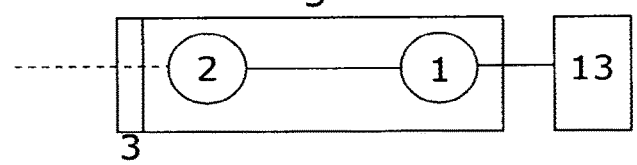
FIG. 2 is a schematic drawing of a first embodiment comprising a ranking unit and a matching unit.

FIG. 2 illustrates an embodiment comprising an input mechanism 3, a ranking unit 2 and a matching unit 1. In this embodiment the ranking unit rank both bid and ask order/quote messages received as input data. As can be seen in the figure the ranking unit is separate from the matching unit and connected to the input mechanism 3. When the matching unit has matched two orders (thus a trade occurred) it may send a deal message to a memory 13 for storage, the deal message is also sent to a clearing and settlement system comprising accounts for the participants involved in the trade in order to update the accounts with the new information. However the clearing and settlement system is not mentioned in the figures for simplicity reasons. As mentioned earlier the deal message is also sent to the associated ranking units.

Figure 3:
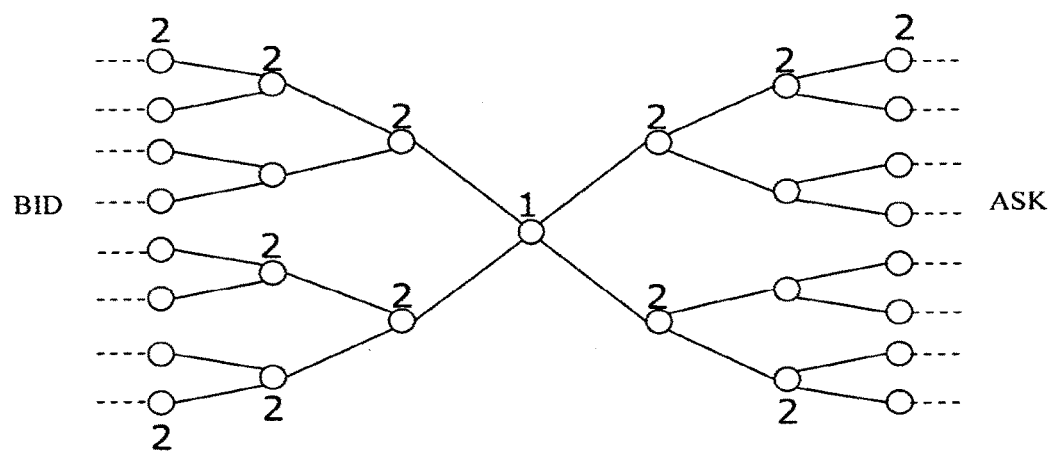
FIG. 3 is a schematic drawing of a second embodiment comprising multiple levels of ranking units.

FIG. 3 illustrates an embodiment comprising multiple ranking units 2. The figure also illustrates that some ranking units 2 are receiving messages in the form of bids orders/quotes and other ranking units 2 are receiving messages in the form of ask orders/quotes. As can be seen the ranking is thus distributed to a number of ranking units 2 and only the top ranked order/quote from each ranking unit 2 is forwarded to the next level of ranking units 2 and in the final step only the top ranked ask order/quote and the top ranked bid order/quote is sent to the matching unit 1. Each ranking unit 2 may be a core unit in a multi core processor, wherein the core unit is configured to rank either ask or bid order/quotes.

Preferably the matching unit 1 and the ranking units 2 each have own logs wherein each new order is logged together with a time stamp. As mentioned above the time stamp is preferably done by the most central ranking unit or the matching unit that the order reaches at the order entry time. This time stamp is propagated backwards all the way to the input mechanism 3.

Figure 4:
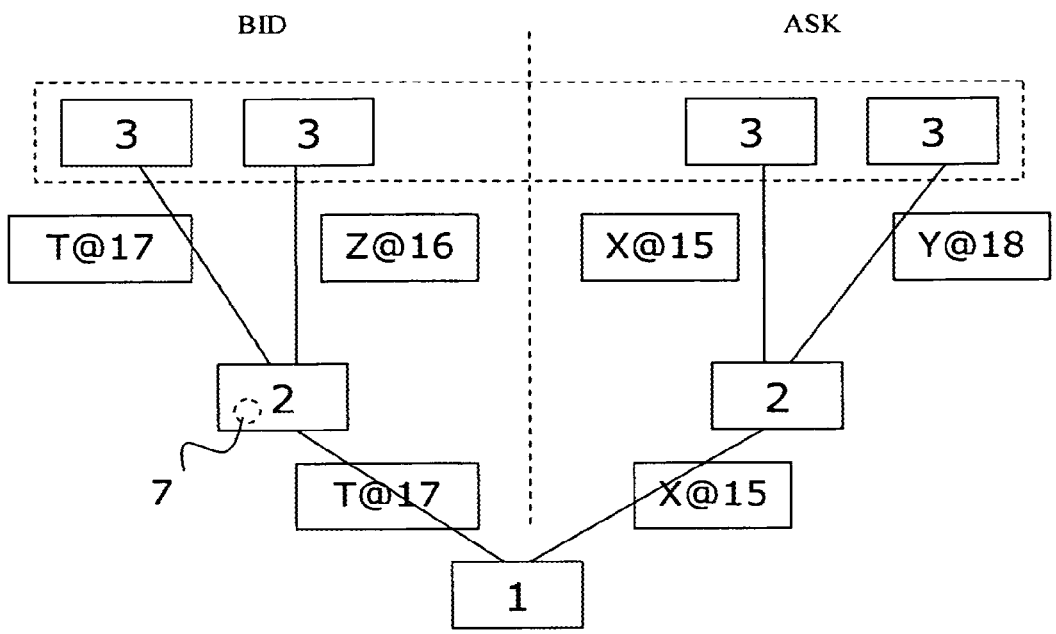
FIG. 4 illustrates a ranking scenario.

In FIG. 4 an example of a ranking scenario is illustrated, the input mechanism 3 receives and forwards orders to the ranking units 2. On the bid side two orders are sent to the ranking unit, one order with the volume T at the price 17 and another order with the volume Z and the prices 16. The ranking unit compares these orders and since it is bid orders the order with the highest price is selected as the top ranked order which is sent to the matching unit 1. On the ask side an order with the volume X at the price 15 and a second order with the volume Y at the price 18 is sent to the ranking unit 2 from the input mechanism 3. Since these orders are ask order the ranking unit selects the order having the lowest price 15 to be the top ranked order which is sent to the matching unit 1.

Figure 5:
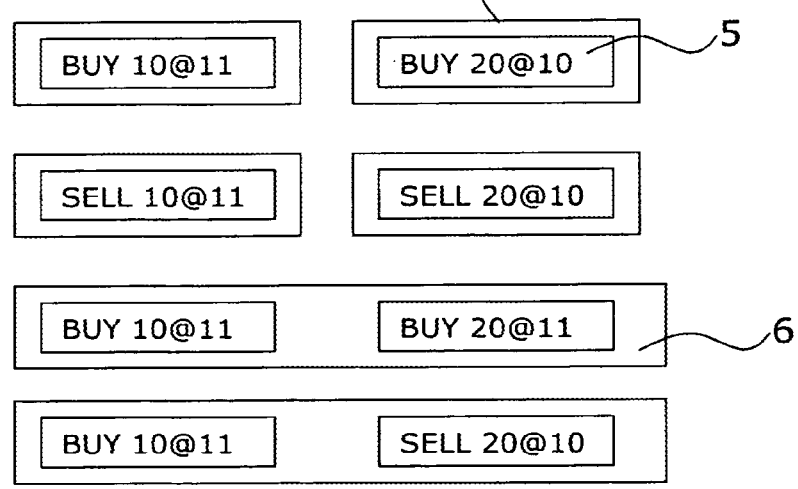
FIG. 5 illustrates input data in the form of order/quote messages.

FIG. 5 illustrates input data in the form of messages 6 comprising orders 5. As mentioned earlier the input data can also be quotes comprising two or more orders, which is also illustrated in FIG. 5.

Figure 6:
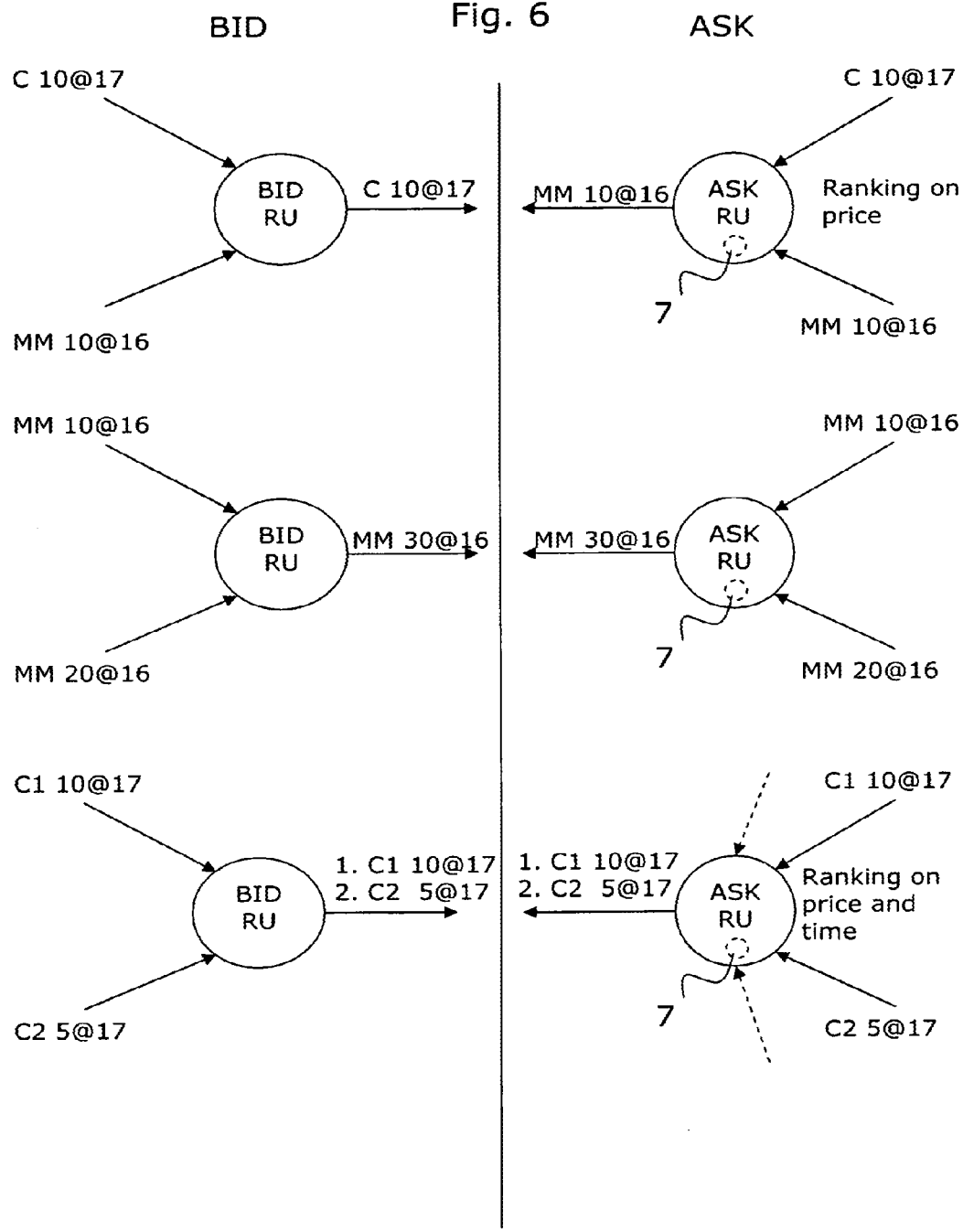
FIG. 6 illustrates different ranking scenarios.

FIG. 6 illustrates different scenarios when the ranking units use different ranking value parameters. The first ranking scenario on the ask side ranks two orders, a first order received from a customer C with the volume 10 at the price 17, the second order is received from a market maker MM with the volume 10 at the price 16. Since the first ranking criteria is price in this case and since it is on the ask side the order having the lowest price is ranked as the top ranked order, thus the MM order 10@16 is sent to the matching unit. The second scenario illustrates a case when two market makers has sent in ask order at the same price 16 but with different volume. In this case the two orders will be aggregate and sent to the matching unit as one order 30@16. This is because the market makers are of the same participant type MM. The third scenario on the ask side is the case when two customers C1 and C2 sends in two orders, 10@17 and 5@17. First the ranking is made on price, however since the orders have the same price a second ranking step is performed, this time the ranking is base on the time priority. Since C1 was before C2, C1s order will be ranked as the top ranked order. However since both orders have the same price both will be sent to the matching unit, but they will have an internal priority based on the ranking. The reason for sending in both orders is because it is preferred to show more volume at the best price, however other configurations may be used depending on the rules of the electronic exchange. Thus, since C1 had better time priority C1s order will first be sent in to the matching unit. This can be done in two ways either in two separate messages, or both C1s order and C2s order can be aggregated into one message in order to save overhead. However the internal order in the aggregated message may preferably be based on the ranking i.e. C1 will be located in the message so it will be matched in the matching unit before C2. The scenario is similar on the bid side, however the ranking is different with regards to the price as mentioned earlier. The dotted arrows in the figure on the ask side represent the possibility for any ranking unit to receive more than two order/quote messages.

Figure 7:
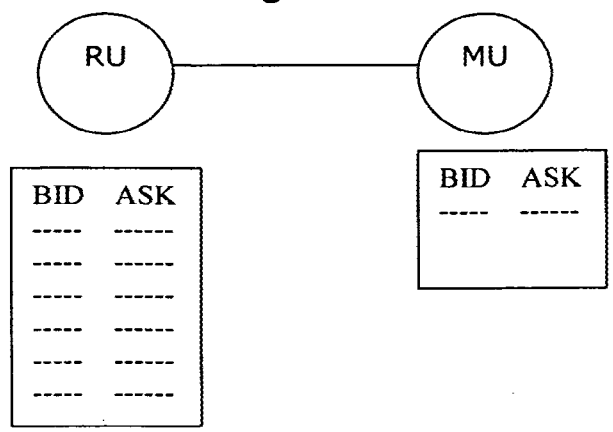
FIG. 7 illustrates memories associated with the ranking unit and matching unit.

FIG. 7 illustrates the memories or memory allocations that are associated with the ranking unit and matching unit. Preferably all messages not being matched are stored in a memory that is an orderbook. However the orders not being ranked as top ranked orders are stored in the orderbook and preferably only the Best bid offer (BBO) orders are stored in the memory associated with the matching unit. As mentioned above in FIG. 6, two or more orders having the same price may thus be stored in the memory allocation associated with the matching unit 1.

Figure 8:
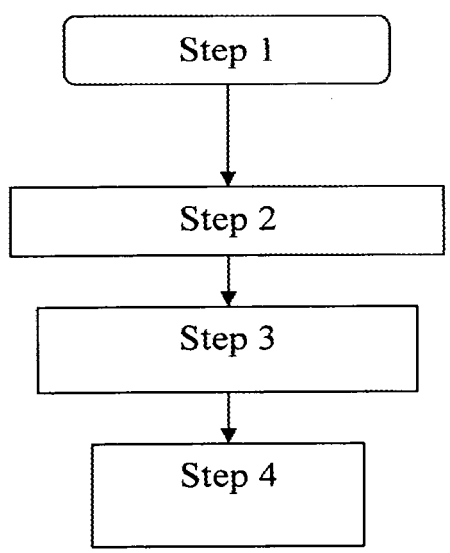
FIG. 8 illustrates an example method.

FIG. 8 illustrates the basic steps of an example method. In a first step orders are received at a ranking unit 2, thereafter the ranking unit 2 ranks the orders based on the ranking value parameters. In a third step the ranking unit sends the top ranked bid and or ask order to the matching unit 1. Finally in a fourth step the matching unit 1 matches the top ranked bid/ask order with another top ranked ask/bid order if a match is possible.

Figure 9:
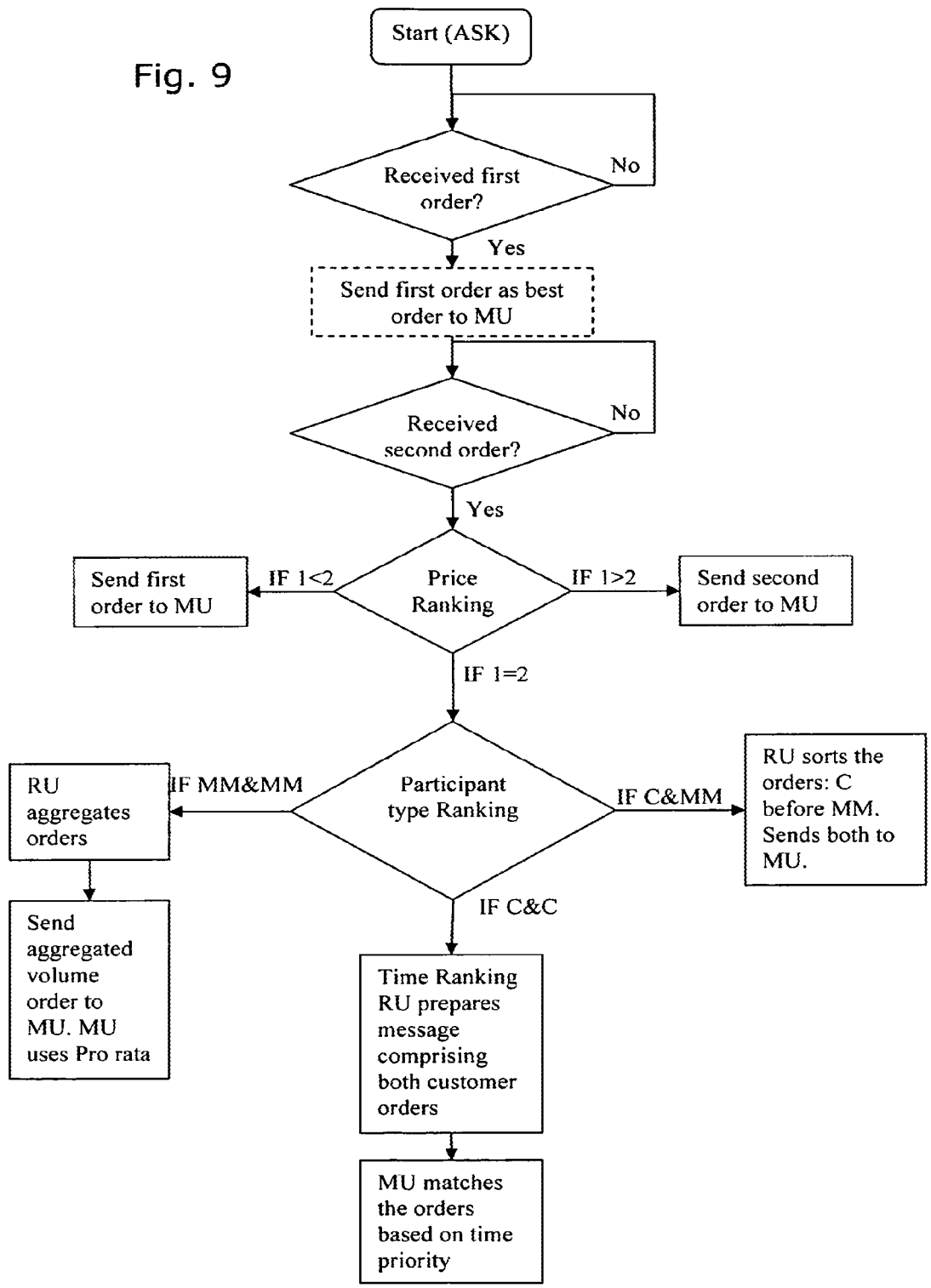
FIG. 9 illustrates an example method.
Figure 10:
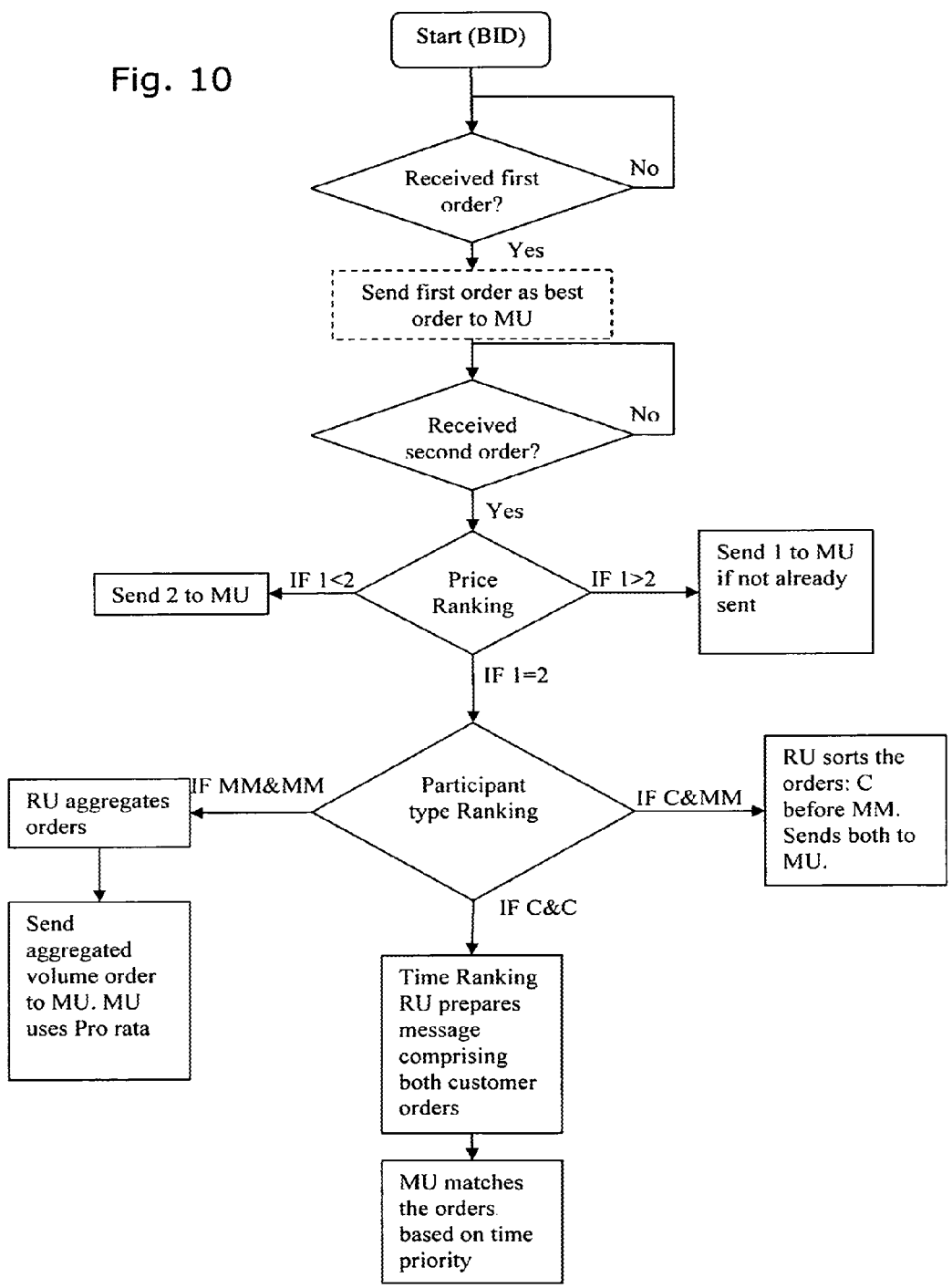
FIG. 10 illustrates an example method.

FIGS. 9 and 10 illustrate embodiments of example computer implemented methods for an ask order and a bid order, respectively, and include similar steps. The system is waiting for receiving orders and upon receiving a first order it preferably directly forwards that order to the matching unit, then it checks if a second order is received. If a second order is not received, the first order is already sent as best order directly to the matching unit. If a second order is received on the other hand, a comparison is made between the first order and the second order and the top ranked order is sent to the matching unit 1. In the flow chart in FIG. 9, if the first order is better than the second order, the second order is sent to the matching unit, while in FIG. 10 the first order is sent to the matching unit if not already sent. On the other hand if the second order is better than the first order, in FIG. 9, the first order is sent to the matching unit, while in FIG. 10, the second order is sent to the matching unit as the top ranked order. If the comparison results in that both orders gets the same ranking in a first comparison the method may continue to compare the orders based on a second ranking parameter. In this example the second ranking parameter is participant type ranking, however any one of the ranking parameters mentioned could be used as a second step. However it is up to each exchange to decide upon configuration of the system how it should work. Thus if the participant ranking is used the following outcomes may occur: If both orders are sent in by market makers MM, pro rata may be used. Pro rata means that both orders are sent in to the matching unit and both market makers will get a fair part of the available volume if a match occurs. For example if both market makers send in an order with the same volume a fair part would be 50/50. If one of the orders is sent in by a customer and one of the orders is sent in by a market maker the customer will in this case be prioritized compared to the market maker. This is due to the regulations which are usually decided by governments, for example the SEC in the USA or by MiFID in Europe. If both orders are sent in by customers the orders will be ranked based on time priority similar to the example in FIG. 6.

In the above description the term "comprising" does not exclude other elements or steps and "a" or "an" does not exclude a plurality.

Furthermore the terms "include" and "contain" does not exclude other elements or steps.

The invention claimed is:

1. An incoming data message router of an electronic exchange system, comprising:
   an input data message interface configured to receive over a communications network incoming order data messages from external electronic user trading devices,
   a first ranking data processor,
   a second ranking data processor, and
   a router configured to, based on order data message content, route the incoming order data messages to one of the first ranking data processor and the second ranking data processor, wherein the router is further configured to:
   route order data messages, including bid orders, to the first ranking data processor, and
   route order data messages, including ask orders, to the second ranking data processor;
   the first ranking data processor further configured to:
   rank a first number of bid order data messages based on a comparison with a ranking value parameter, and
   transmit only a second number of top ranked bid orders data messages to a matching data processor of the electronic exchange system for subsequent processing,
   the second ranking data processor, independently of the first ranking data processor, further configured to:
   rank a third number of ask order data messages based on a comparison with the ranking value parameter, and
   transmit only the second number of top ranked ask order data messages to the matching data processor of the electronic exchange system for subsequent processing,
   wherein the second number of top ranked messages is less than the first number of bid order messages and the third number of ask order messages.

2. The data message router of claim 1, wherein the first and the second ranking data processors are both associated with a respective memory, wherein said memories are configured to store order data messages that have not been transmitted to the matching data processor for subsequent processing.

3. The data message router of claim 1, wherein both ranking data processors each further comprise consolidator logic configured to aggregate the top ranked order data messages of said each ranking data processor to minimize overhead payload in transmission of the top ranked order data messages.

4. The data message router in claim 1, wherein the first and the third numbers are the same.

5. The data message router in claim 1, wherein said data message router includes a hierarchy of first ranking data processors including multiple tiers of first ranking data processors and a hierarchy of second ranking data processors including multiple tiers of second ranking data processors,
   wherein each first ranking data processor in a lower tier of first ranking data processors is configured to:
   rank bid order data messages based on a comparison with a ranking value parameter, and
   transmit only top ranked bid order data messages to a first ranking data processor in a next higher tier of first ranking data processors for subsequent processing,
   wherein each second ranking data processor in a lower tier of second ranking data processors is configured to:
   rank ask order data messages based on a comparison with a ranking value parameter, and
   transmit only top ranked ask order data messages to a second ranking data processor in a next higher tier of second ranking data processors for subsequent processing.

6. The data message router in claim 1, wherein each order data message is associated with a time stamp.

7. A method in a data message router of an electronic exchange, the method comprising:
   receiving order data messages from external electronic user communication devices;
   routing, by said data message router, received order data messages to one of a first ranking data processor and a second ranking data processor;
   ranking, by the first ranking data processor of said data message router, a first number of incoming bid order data messages to obtain an item based on a ranking value parameter;
   transmitting, by the first ranking data processor, only a second number of top ranked bid order data messages to a matching data processor of the electronic exchange;
   ranking, by the second ranking data processor of said data message router, a third number of incoming ask order data messages based on the ranking value parameter; and
   transmitting, by the second ranking data processor, only the second number of top ranked ask order data messages to the matching data processor of the electronic exchange, wherein the second number of top ranked data messages is less than the first number of incoming bid order data messages and the third number of incoming ask order data messages.

8. The method of claim 7, further comprising:
storing, by the first and the second ranking data processors, order data messages to a respective memory, each memory associated to a respective first and second ranking data processor.

9. The method of claim 7, further comprising:
aggregating, by consolidator logic of said data message router, the top ranked data messages of each ranking data processor to minimize overhead payload in a data transmission of the top ranked data messages.

10. The method of claim 7, wherein the first and the third numbers are the same.

11. The method in claim 7, wherein the first and second ranking data processors rank order data messages based on comparison with multiple different ranking value parameters.

12. The method in claim 7, wherein said data message router includes a hierarchy of first ranking data processors including multiple tiers of first ranking data processors and a hierarchy of second ranking data processors including multiple tiers of second ranking data processors, the method further comprising each first ranking data processor in a lower tier of first ranking data processors:
ranking bid order data messages based on a comparison with a ranking value parameter, and
transmitting only top ranked bid order data messages to a first ranking data processor in a next higher tier of first ranking data processors for subsequent processing,
the method further comprising each second ranking data processor in a lower tier of second ranking data processors:
ranking ask order data messages based on a comparison with a ranking value parameter, and
transmitting only top ranked ask order data messages to a second ranking data processor in a next higher tier of second ranking data processors for subsequent processing.

13. The method in claim 7, wherein each data request is associated with a time stamp.

14. The method in claim 7, wherein the first and second ranking data processors rank order data messages based on comparison with multiple different ranking value parameters.

* * * * *